(12) United States Patent
Kwon et al.

(10) Patent No.: US 9,851,862 B2
(45) Date of Patent: Dec. 26, 2017

(54) DISPLAY APPARATUS AND DISPLAYING METHOD FOR CHANGING A CURSOR BASED ON A USER CHANGE OF MANIPULATION MODE

(71) Applicant: SAMSUNG ELECTRONICS CO., LTD., Suwon-si (KR)

(72) Inventors: Sung-hyuk Kwon, Suwon-si (KR); Woo-seok Hwang, Seoul (KR); Jang-won Seo, Seoul (KR); Dong-hun Lee, Suwon-si (KR); Sang-jin Han, Gunpo-si (KR); Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 14/862,353

(22) Filed: Sep. 23, 2015

(65) Prior Publication Data

US 2016/0085410 A1   Mar. 24, 2016

(30) Foreign Application Priority Data

Sep. 23, 2014  (KR) .......................... 10-2014-0127068

(51) Int. Cl.
*G06F 3/0481* (2013.01)
*G06F 3/16* (2006.01)
*G06F 3/0484* (2013.01)
*G06F 3/0488* (2013.01)

(52) U.S. Cl.
CPC ...... *G06F 3/04812* (2013.01); *G06F 3/04817* (2013.01); *G06F 3/04842* (2013.01); *G06F 3/04886* (2013.01); *G06F 3/167* (2013.01); *G06F 2203/0381* (2013.01); *G06F 2203/04801* (2013.01)

(58) Field of Classification Search
CPC ............. G06F 3/04812; G06F 3/04817; G06F 3/04842; G06F 3/04886; G06F 3/167; G06F 2203/0381; G06F 2203/04801
See application file for complete search history.

(56) References Cited

U.S. PATENT DOCUMENTS 6,519,566 B1   2/2003  Boyer et al.
8,184,096 B2   5/2012  Louch
(Continued)

FOREIGN PATENT DOCUMENTS

CN   102739275 A   10/2012
CN   103577041 A   2/2014
(Continued)

OTHER PUBLICATIONS

Communication dated Jan. 4, 2016 issued by the European Patent Office in counterpart European Application No. 15186534.2.
(Continued)

*Primary Examiner* — Larry Sternbane
(74) *Attorney, Agent, or Firm* — Sughrue Mion, PLLC

(57) ABSTRACT

A display apparatus and a displaying method thereof are provided. The displaying method of the display apparatus includes displaying a cursor, changing a manipulation mode of the display apparatus based on an input, and changing the cursor to a highlight or a mode guide icon corresponding to the changed manipulation mode.

14 Claims, 23 Drawing Sheets

(56) References Cited

U.S. PATENT DOCUMENTS

| | | | |
|---|---|---|---|
| 2004/0021643 A1* | 2/2004 | Hoshino | G06F 3/016 345/173 |
| 2009/0051665 A1 | 2/2009 | Jang et al. | |
| 2010/0100849 A1 | 4/2010 | Fram | |
| 2010/0251170 A1* | 9/2010 | Louch | G06F 17/30861 715/810 |
| 2010/0281384 A1* | 11/2010 | Lyons | G06F 3/048 715/723 |
| 2011/0289438 A1* | 11/2011 | Hwang | H04M 1/27455 715/764 |
| 2012/0113037 A1 | 5/2012 | Jang et al. | |
| 2012/0194428 A1 | 8/2012 | Kwon et al. | |
| 2012/0200497 A1 | 8/2012 | Nasiri et al. | |
| 2012/0262370 A1 | 10/2012 | Ko et al. | |
| 2012/0278727 A1 | 11/2012 | Ananthakrishnan et al. | |
| 2014/0047392 A1* | 2/2014 | Kim | G06F 3/04812 715/846 |

FOREIGN PATENT DOCUMENTS

| | | | | |
|---|---|---|---|---|
| EP | 2464100 | A2 | 6/2012 | |
| EP | 2511811 | A2 | 10/2012 | |
| EP | 2696271 | A2 | 2/2014 | |
| EP | 2728452 | A2 | 5/2014 | |
| KR | 10-2009-0019587 | A | 2/2009 | |
| KR | 10-2010-0136289 | A | 12/2010 | |
| KR | 10-2012-0016773 | A | 2/2012 | |
| KR | EP 2511811 | A2 * | 10/2012 | ......... G06F 3/03547 |
| WO | 2010/135128 | A1 | 11/2010 | |

OTHER PUBLICATIONS

International Search Report dated Jan. 20, 2016 issued by the International Searching Authority in counterpart International Appln. No. PCT/KR2015/009998 [PCT/ISA/210].

Written Opinion dated Jan. 20, 2016 issued by the International Searching Authority in counterpart International Appln. No. PCT/KR2015/009998 [PCT/ISA/237].

Communication dated Feb. 27, 2017 by the European Patent Office in counterpart European Patent Application No. 15186534.2.

Communication dated Oct. 11, 2017, issued by the State Intellectual Property Office of People's Republic of China in counterpart Chinese Application No. 201510612662.9.

* cited by examiner

100

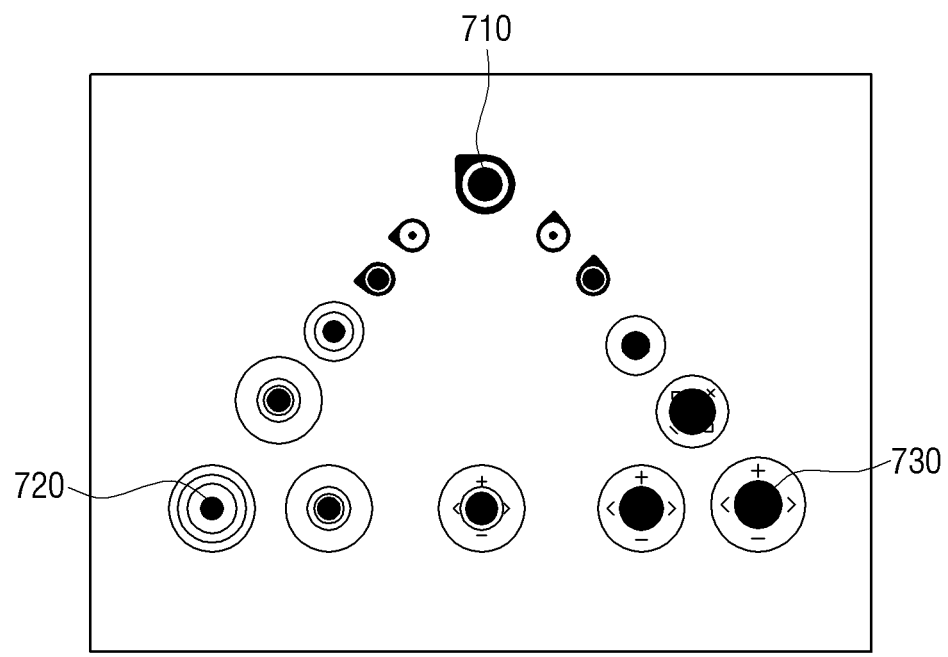

DISPLAY APPARATUS AND DISPLAYING METHOD FOR CHANGING A CURSOR BASED ON A USER CHANGE OF MANIPULATION MODE

CROSS-REFERENCE TO RELATED APPLICATION

This application claims priority from Korean Patent Application No. 10-2014-0127068, filed on Sep. 23, 2014, in the Korean Intellectual Property Office, the disclosure of which is incorporated herein by reference in its entirety.

BACKGROUND

1. Field

Apparatuses and methods consistent with exemplary embodiments relate to a display apparatus and a displaying method thereof.

2. Description of the Related Art

A display apparatus provides various functions in addition to a conventional broadcast receiving function. For example, a display apparatus may provide diverse functions, such as a web browsing function, a social network service (SNS) function, a content retrieving function, etc.

As a display apparatus provides diverse functions, there are various manipulation methods for the display apparatus. For instance, the manipulation methods may include a method of controlling a display apparatus by using a highlight, a method of controlling a display apparatus through voice recognition or motion recognition, and the like, in addition to a conventional method of controlling a display apparatus by using a remote controller.

However, in such a conventional display apparatus, a cursor may still remain on a screen even after a mode of the display apparatus is changed, and user interfaces (UI) for respective manipulation modes of the display apparatus may not operate with each other.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a display apparatus that displays one among a cursor, a highlight, and a mode guide icon on a display screen according to a manipulation mode of the display apparatus, and a displaying method thereof.

According to an aspect of an exemplary embodiment, there is provided a displaying method of a display apparatus, the method including a displaying method of a display apparatus, the method including displaying a cursor, changing a manipulation mode of the display apparatus based on an input, and changing the cursor to a highlight or a mode guide icon corresponding to the changed manipulation mode.

The method may further include displaying display items, and the changing the cursor may include moving the cursor to a display item closest to the cursor among the display items, and changing the cursor to the highlight of the display item, in response to the changed manipulation mode corresponding to a highlight manipulation mode.

The changing the manipulation mode may include changing the manipulation mode to the highlight manipulation mode in response to the input being a release of a touch input to a touch area of an input interface.

The changing the cursor may include changing the cursor to the mode guide icon corresponding to the changed manipulation mode in response to the changed manipulation mode corresponding to a motion manipulation mode or a voice manipulation mode.

The changing the cursor may further include moving the cursor to a location on a display in response to the changed manipulation mode corresponding to the motion manipulation mode or the voice manipulation mode.

The changing the cursor may include morphing the cursor to gradually change the cursor to the highlight or the mode guide icon.

The method may further include displaying, in the cursor, an icon corresponding to a status of the cursor and/or a status of the display apparatus.

The method may further include displaying image content, displaying a menu in an area of the display on which the image content is displayed, and deactivating a remaining area of the display, in response to a menu generating input, displaying, in the cursor, an icon corresponding to a previous command, in response to an input moving the cursor to the deactivated remaining area, and removing the menu, and activating the remaining area, in response to a selecting input of the icon.

The method may further include displaying an interface that shows a call answering request in an area of the display, and displaying, in the cursor, an icon corresponding to the call answering request, in response to the call answering request, and accepting the call answering request in response to a selecting input of the icon.

According to an aspect of another exemplary embodiment, there is provided a display apparatus including a display configured to display a cursor, and a controller configured to change a manipulation mode of the display apparatus based on an input, and control the display to change the cursor to a highlight or a mode guide icon corresponding to the changed manipulation mode.

The display may be further configured to display display items, and the controller may be further configured to control the display to move the cursor to a display item closest to the cursor among the display items, and change the cursor to the highlight of the display item, in response to the changed manipulation corresponding to a highlight manipulation mode.

The controller may be further configured to change the manipulation mode to the highlight manipulation mode in response to the input being a release of a touch input to a touch area of an input interface.

The controller may be further configured to control the display to change the cursor to the mode guide icon corresponding to the changed manipulation mode in response to the changed manipulation mode corresponding to a motion manipulation mode or a voice manipulation mode.

The controller may be further configured to control the display to move the cursor to a location on the display in response to the changed manipulation mode corresponding to the motion manipulation mode or the voice manipulation mode.

The controller may be further configured to control the display to morph the cursor to gradually change the cursor to the highlight or the mode guide icon.

The controller may be further configured to control the display to display, in the cursor, an icon corresponding to a status of the cursor and/or a status of the display apparatus.

The controller may be further configured to control the display to display image content, display a menu in an area of the display on which the image content is displayed, and deactivate a remaining area of the display, in response to a menu generating input, display, in the cursor, an icon corresponding to a previous command, in response to an input moving the cursor to the deactivated remaining area, and remove the menu, and activate the remaining area, in response to a selecting input of the icon.

The controller may be further configured to control the display to display an interface that shows a call answering request in an area of the display, and display, in the cursor, an icon corresponding to the call answering request, in response to the call answering request, and accept the call answering request in response to a selecting input of the icon.

According to an aspect of another exemplary embodiment, there is provided a display apparatus including a display configured to display an interface element, and highlight the interface element, and a controller configured to change an interface mode of the display apparatus based on an input, and control the display to change the highlight to a cursor or a mode guide icon corresponding to the changed interface mode.

The display may be further configured to display interface elements, and the highlight may be of the interface element among the interface elements.

The controller may be further configured to change the interface mode to a cursor interface mode in response to the input being a touch input to a touch area of an input interface, and control the display to change the highlight to the cursor in response to the controller changing the interface mode to the cursor interface mode.

The controller may be further configured to change the interface mode to a motion interface mode or a voice interface mode in response to the input being a motion or a voice to an input interface, and control the display to change the highlight to the mode guide icon in response to the controller changing the interface mode to the motion interface mode or the voice interface mode.

The controller may be further configured to morph the cursor or the mode guide icon to gradually change the highlight to the cursor or the mode guide icon.

The interface mode may be a mode in which the display displays one among the highlight, the cursor, and the mode guide icon for a user to control the display apparatus.

BRIEF DESCRIPTION OF THE DRAWINGS

The above and/or other aspects will be more apparent by describing certain exemplary embodiments with reference to the accompanying drawings, in which:

FIGS. 3A, 3B, 3C, 4A, 4B, 4C, 5A, 5B, 5C, 6A, 6B, 6C, 7, 8, 9A, 9B, 9C, 9D, 9E, and 10 are views illustrating changing a UI according to a manipulation mode of a display apparatus according to various exemplary embodiments.

DETAILED DESCRIPTION OF THE EXEMPLARY EMBODIMENTS

Figure 1:
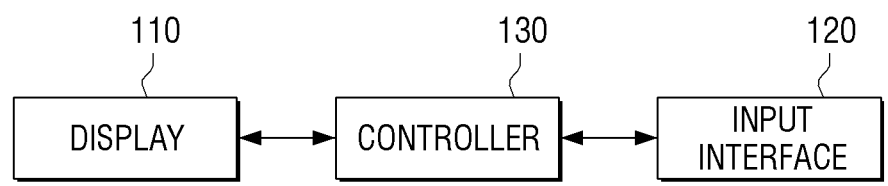
FIG. 1 is a block diagram illustrating a configuration of a display apparatus according to an exemplary embodiment.

Exemplary embodiments are described in greater detail herein with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without those defined matters. Also, well-known functions or constructions are not described in detail because they would obscure the application with unnecessary detail.

In the following description, relational terms, such as 'first' and 'second,' may be used to distinguish one entity from another entity, without necessarily implying any actual relationship or order between such entities.

The terms used in the following description are provided to explain exemplary embodiments and are not intended to limit the scope of rights. A term in a singular form includes a plural form unless it is intentionally written that way. The terms, such as 'include,' 'comprise,' 'configured to,' in the description are used to indicate that there are features, numbers, steps, operations, elements, parts or combinations thereof, and they should not exclude the possibilities of combinations or additions of one or more features, numbers, steps, operations, elements, parts or combinations thereof.

In addition, the terms such as "unit," "-er (-or)," and "module" described in the specification refer to an element for performing at least one function or operation, and may be implemented in hardware, software, or a combination of hardware and software.

FIG. 1 is a block diagram illustrating a configuration of a display apparatus according to an exemplary embodiment. As illustrated in FIG. 1, a display apparatus 100 includes a display 110, an input interface 120, and a controller 130. The display apparatus 100 may be realized as a smart television (TV), but is not limited thereto. That is, the display apparatus 100 may be realized as various types of display apparatuses such as a desktop personal computer (PC), a laptop PC, a tablet PC, a kiosk, etc.

The display 110 displays at least one among image data received from an external source and a UI according to control of the controller 130. The display 110 may display one among a cursor, a highlight, and a mode guide icon for a user to control the display apparatus according to a manipulation mode of the display apparatus 100.

The input interface 120 receives a user command to control the display apparatus 100. The input interface 120 also receives a user manipulation for changing the manipulation mode of the display apparatus 100.

The controller 130 controls overall operations of the display apparatus 100 according to a user command received through the input interface 120. For example, in response to the manipulation mode of the display apparatus 100 being changed according to a user manipulation received through the input interface 120 while a cursor is displayed on the display 110, the controller 130 may control the display 110 to change the cursor to, and display, one among a highlight and a mode guide icon according to the changed manipulation mode of the display apparatus 100.

In another example, in response to the manipulation mode of the display apparatus 100 being changed to a highlight manipulation mode according to a user manipulation received through the input interface 120 while the display 110 displays the cursor and a plurality of display items, the controller 130 may control the display 110 to move the cursor to a first display item that is closest to the cursor among the plurality of display items, and change the cursor to a highlight of the first display item. In this case, in order to change the manipulation mode of the display apparatus 100 to the highlight manipulation mode, the input interface 120 may receive a user manipulation of releasing a touch input to a predetermined touch area of the input interface 120.

In response to the manipulation mode of the display apparatus 100 being changed to a motion manipulation mode or a voice manipulation mode according to a user manipulation received through the input interface 120, the controller 130 may control the display 110 to change the cursor to a mode guide icon that represents the changed manipulation mode. For example, in response to the manipulation mode of the display apparatus 100 being changed to the motion manipulation mode according to a user manipulation, the controller 130 may control the display 110 to change the cursor to a mode guide icon that represents the motion manipulation mode. In this case, the controller 130 may control the display 110 to move the cursor to a location on the display screen (for example, an upper central area), and change the cursor to the mode guide icon.

When the cursor is changed to one among a highlight and a mode guide icon, the controller 130 may provide a morphing animation effect of gradually changing the cursor between the highlight and the mode guide icon.

The controller 130 may control the display 110 to display an icon corresponding to at least one among status information on the cursor and status information on the display apparatus 100, in the cursor while the display apparatus 100 operates in a cursor manipulation mode.

For example, in response to a menu generating input being received while an image content is displayed on the display screen, the controller 130 may control the display 110 to display a menu in an area of the display screen, and deactivate a remaining area of the display screen. In addition, in response to the cursor being located in the deactivated remaining area, the controller 130 may control the display 110 to display an icon that represents a previous command in the cursor. In response to a predetermined user command (for example, a user command to select an 'OK' button) being received while the icon that represents the previous command is displayed in the cursor, the controller 130 may control the display 110 to remove a menu and display an image content.

As another example, in response to a call answering request being received from outside, the controller 130 may control the display 110 to display a UI that shows the call answering request in an area of the display screen, and display an icon that represents the call answering request in the cursor. In response to a predetermined user command (for example, a user command to select an 'OK' button) being received while the icon that represents the call answering request is displayed in the cursor, the controller 130 may perform a telephone conversation by accepting the call answering request.

As described above, the display apparatus 100 enables a user to check the manipulation mode of the display apparatus any time and enjoy entertainment elements.

Figure 2:
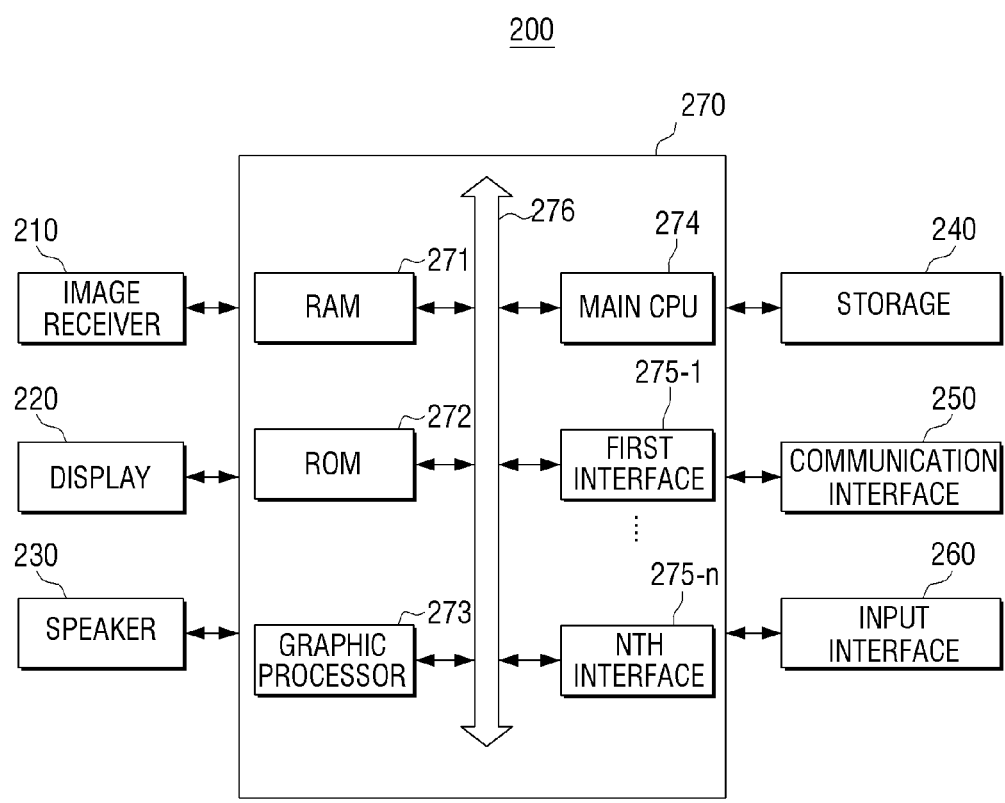
FIG. 2 is a block diagram illustrating a detailed configuration of a display apparatus according to an exemplary embodiment.

FIG. 2 is a block diagram illustrating a detailed configuration of a display apparatus 200 according to an exemplary embodiment. As illustrated in FIG. 2, the display apparatus 200 includes an image receiver 210, a display 220, a speaker 230, a storage 240, a communication interface 250, an input interface 260, and a controller 270.

The image receiver 210 receives various image contents from an external source. For example, the image receiver 210 may receive a broadcasting content from an external broadcasting station, receive an image content from an external device (for example, a digital versatile disk (DVD) player, etc.), and receive a video on demand (VOD) content from an external server.

The display 220 displays at least one among an image content received through the image receiver 210 and various UIs processed by a graphic processor 273. The display 220 displays a UI according to a manipulation mode of the display apparatus 200. For example, when the manipulation mode of the display apparatus 200 is a cursor manipulation mode, the display 220 may display a cursor. When the manipulation mode of the display apparatus 200 is a highlight manipulation mode, the display 220 may display a highlight of one among a plurality of items. In addition, when the manipulation mode of the display apparatus 200 is a motion manipulation mode or a voice manipulation mode, the display 220 may display a mode guide icon. In addition, when the manipulation mode of the display apparatus 200 is the cursor manipulation mode, the display 220 may display an icon corresponding to one among status information on the cursor and status information on the display apparatus 200, in the cursor.

The speaker 230 outputs various notification sounds, voice messages, and various audio data processed by an audio processor.

The storage 240 stores various modules for operating the display apparatus 200. For example, the storage 240 may store software including a base module, a sensing module, a communication module, a presentation module, a web browser module, and a service module. The base module refers to a basic module that processes a signal received from each hardware of the display apparatus 200, and transmits the processed signal to an upper layer module. The sensing module refers to a module that collects information from various sensors, and analyzes and manages the collected information. The sensing module may include a face recognition module, a voice recognition module, a motion recognition module, a near field communication (NFC) recognition module, etc. The presentation module refers to a module for configuring a display screen. The presentation module may include a multimedia module for reproducing and outputting a multimedia content and a UI rendering module for performing a UI processing operation and a graphic processing operation. The communication module refers to a module for performing communication with an external device. The web browser module refers to a module that performs a web browsing operation to access a web server. The service module refers to a module that includes various applications for providing diverse services.

As described above, the storage 240 may include various program modules, and the program modules may be partially omitted, modified, and added depending upon a type and characteristics of the display apparatus 200. For example, when the display apparatus 200 is realized as a tablet PC, the base module may further include a global positioning system (GPS)-based positioning module for determining a location, and the sensing module may further include a sensing module for sensing a user gesture.

The communication interface 250 performs communication with various types of external devices according to various communication methods. The communication interface 250 may include various communication chips such as a wireless fidelity (Wi-Fi) chip, a Bluetooth chip, a NFC chip, a wireless communication chip, etc. The Wi-Fi chip, the Bluetooth chip, and the NFC chip perform communication according to a Wi-Fi method, a Bluetooth method, and an NFC method, respectively. The NFC chip refers to a chip that operates according to an NFC method that uses a 13.56

MHz band among various radio frequency-identification (RF-ID) frequency bands such as 135 kHz, 13.56 MHz, 433 MHz, 860~960 MHz, 2.45 GHz, and so on. In the case of the Wi-Fi chip or the Bluetooth chip, various connection information, such as subsystem identification (SSID) and a session key, may be transmitted/received first for communication connection, and then various information may be transmitted/received. The wireless communication chip refers to a chip that performs communication according to various communication standards such as institute of electrical and electronics engineers (IEEE), Zigbee, 3rd generation (3G), 3rd generation partnership project (3GPP), long term evolution (LTE), and so on.

The input interface 260 receives various user manipulations for controlling the display apparatus 200. The input interface 260 receives a user manipulation for changing the manipulation mode of the display apparatus 200. For example, the input interface 260 may receive a user manipulation of touching a touch panel in an area of the input interface 260 to change the manipulation mode of the display apparatus 200 to the cursor manipulation mode. In addition, the input interface 260 may receive a user manipulation of releasing a touch manipulation to the touch panel in the area of the input interface 260 while a plurality of items are displayed on the display 220 to change the manipulation mode of the display apparatus 200 to the highlight manipulation mode. In addition, the input interface 260 may receive a predetermined user motion (for example, a user motion of waving a hand several times) to change the manipulation mode of the display apparatus 200 to the motion manipulation mode. In addition, the input interface 260 may receive a predetermined user voice (for example, "Hi TV") to change the manipulation mode of the display apparatus 200 to the voice manipulation mode.

To receive a user manipulation, the input interface 260 may include various input devices such as a remote controller having a touch panel, a voice input interface, a motion input interface, a pointing device, etc.

The controller 270 controls overall operations of the display apparatus 200 by using various programs stored in the storage 240. As illustrated in FIG. 2, the controller 270 includes a random access memory (RAM) 271, a read-only memory (ROM) 272, the graphic processor 273, a main central processing unit (CPU) 274, first to nth interfaces 275-1 to 275-n, and a bus 276. In this case, the RAM 271, the ROM 272, the graphic processor 273, the main CPU 274, and the first to nth interfaces 275-1 to 275-n are interconnected through the bus 276.

The ROM 272 stores a set of commands for system booting. In response to power that is supplied as a turn-on command being received, the main CPU 274 copies an operating system (O/S) stored in the storage 240 into the RAM 271 according to a command stored in the ROM 272, and boots up a system by executing the O/S. In response to completion of the booting operation, the main CPU 274 copies various application programs stored in the storage 240 into the RAM 271, and executes the application programs copied into the RAM 271 to perform various operations.

The graphic processor 273 generates a screen including various objects such as an icon, an image, a text, etc. by using a computing unit and a renderer. The computing unit computes property values such as coordinates, shape, size, and color of each object according to a layout of the screen by using a control command received from the input interface 260. The renderer generates a screen with various layouts including objects based on the property values computed by the computing unit. The screen generated by the renderer is displayed in a display area of the display 220.

The main CPU 274 accesses the storage 240, and performs the booting operation by using the O/S stored in the storage 240. In addition, the main CPU 274 performs various operations by using various programs, contents, data, etc. stored in the storage 240.

The first to nth interfaces 275-1 to 275-n are connected to the aforementioned various components. One of the interfaces may be a network interface that is connected to an external device via a network.

As described above, in response to the manipulation mode of the display apparatus 200 being changed according to a user manipulation received through the input interface 260, the controller 270 may control the display 220 to change the cursor to, and display, one among the highlight and the mode guide icon according to the changed manipulation mode of the display apparatus 200. Hereinafter, a method of displaying various UIs according to the manipulation mode of the display apparatus 200 by using the controller 270 will be described with reference to FIGS. 3A to 10.

FIGS. 3A to 10 are views illustrating changing a UI according to a manipulation mode of a display apparatus according to various exemplary embodiments.

Figure 3A:
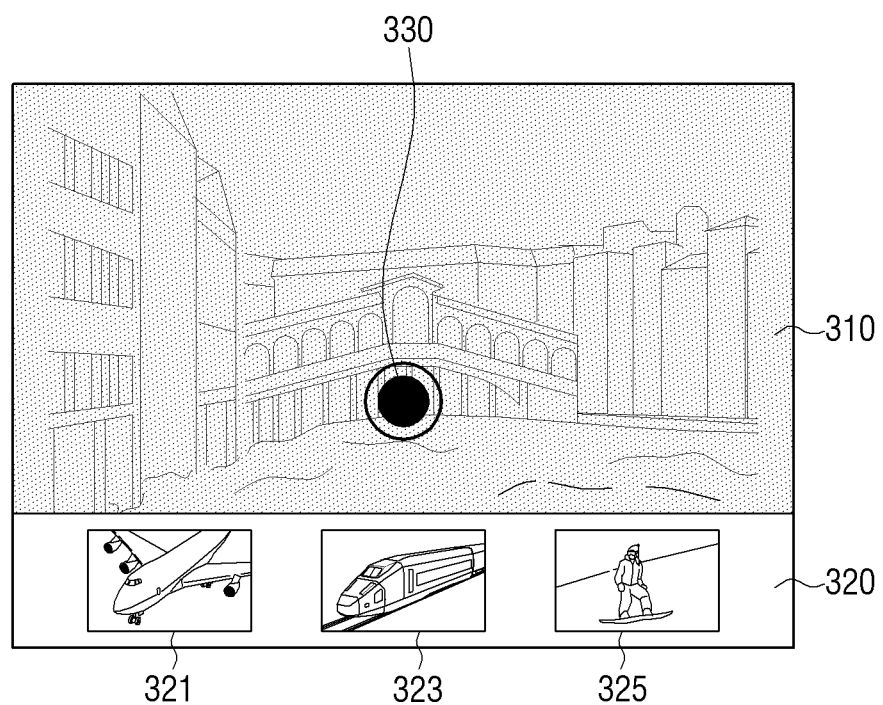

Referring to FIG. 3A, in response to a user manipulation of touching a touch panel in an area of the input interface 260 being received while at least one display item is displayed, the controller 270 changes a manipulation mode of the display apparatus 200 to a cursor manipulation mode. When the manipulation mode of the display apparatus 200 is the cursor manipulation mode, the controller 270 controls the display 220 to divide a display screen into a deactivated area 310 and an item display area 320, and display a cursor 330 in an area of the display screen, as illustrated in FIG. 3A. In this case, an image content in the deactivated area 310 is processed and displayed to be darkened, and first to third display items 321, 323, 325 are displayed in the item display area 320.

Figure 3B:
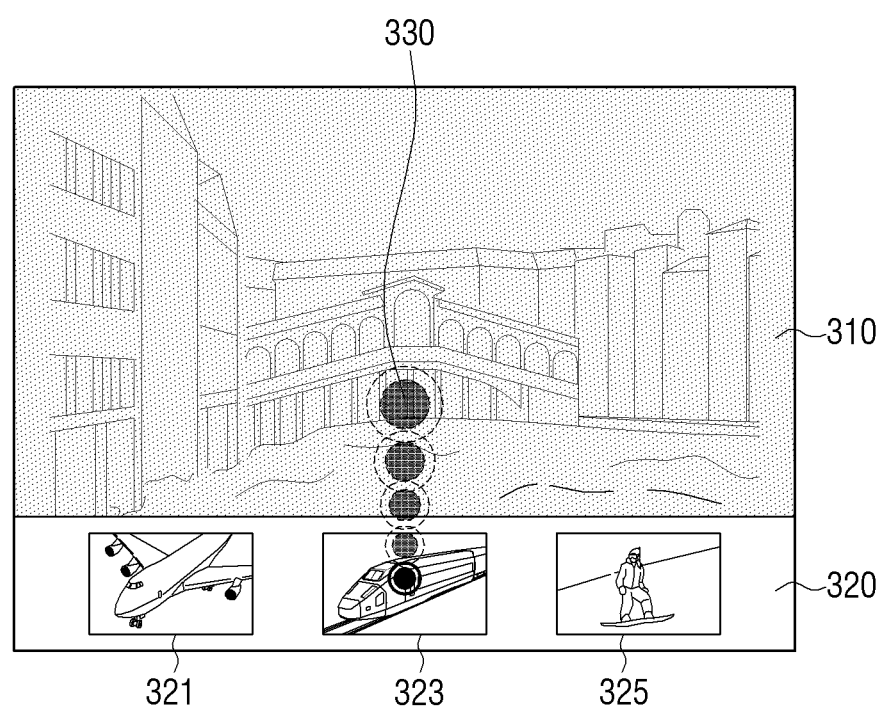
Figure 3C:
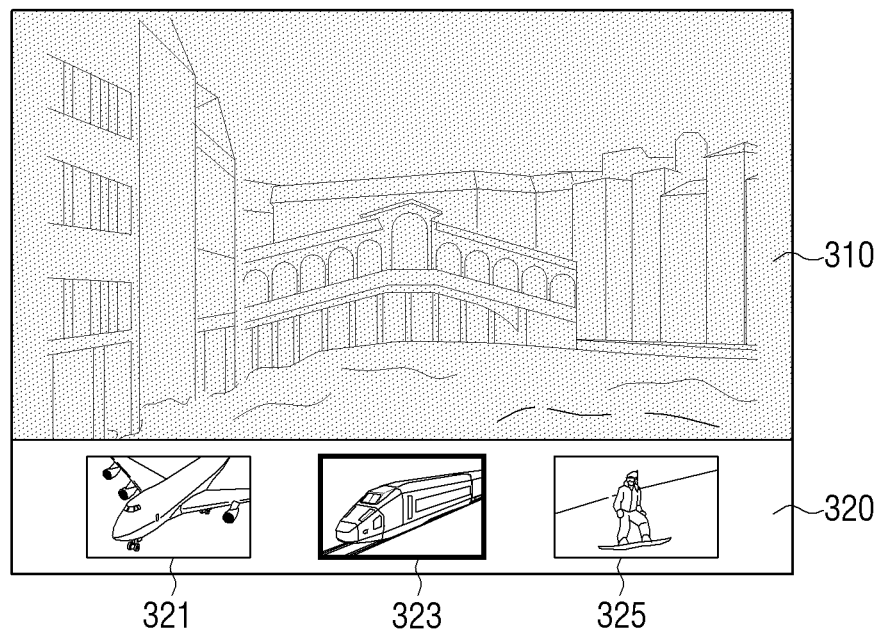

Referring to FIGS. 3B and 3C, in response to a user manipulation of releasing a user touch to the touch panel in an area of the input interface 260 being received while the display apparatus 200 maintains the cursor manipulation mode, the controller 270 changes the manipulation mode of the display apparatus 200 to the highlight manipulation mode. In response to the manipulation mode of the display apparatus 200 being changed to the highlight manipulation mode, the controller 270 controls the display 220 to change the cursor 330 to, and display, a highlight of the second display item 323 that is closest to the cursor 330 among the plurality of display items, as illustrated in FIG. 3C. In this case, as illustrated in FIG. 3B, the controller 270 provides a morphing animation effect of gradually changing the cursor 330 to the highlight of the second display item 323.

Figure 4A:
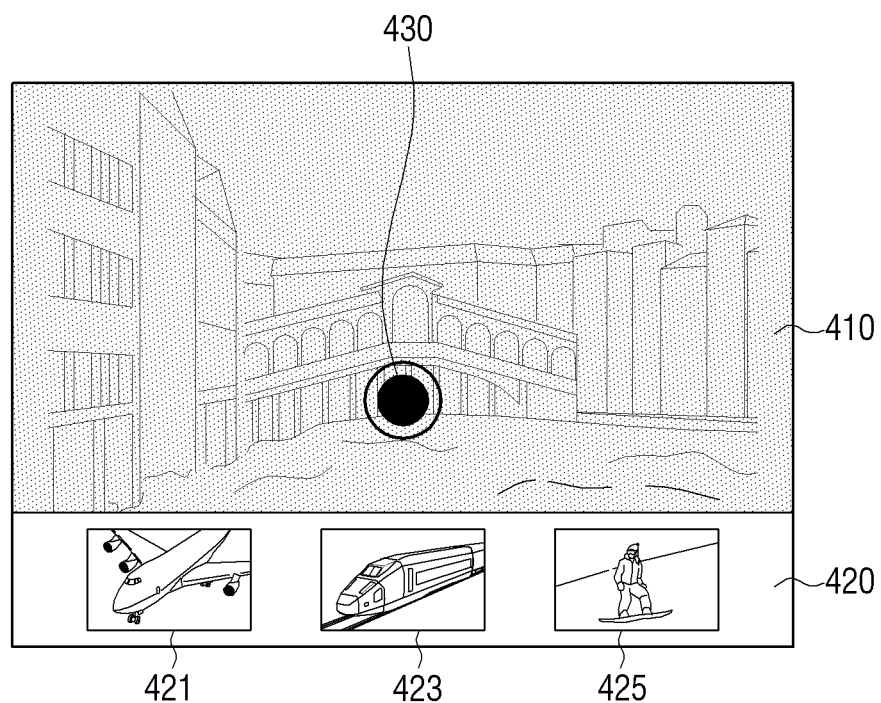

Referring to FIG. 4A, in response to a user manipulation of touching the touch panel in an area of the input interface 260 being received while a plurality of display items are displayed, the controller 270 changes the manipulation mode of the display apparatus 200 to the cursor manipulation mode. When the manipulation mode of the display apparatus 200 is the cursor manipulation mode, the controller 270 controls the display 220 to divide the display screen into a deactivated area 410 and an item display area 420, and display a cursor 430 in an area of the display screen, as illustrated in FIG. 4A. In this case, an image content in the deactivated area 410 is processed and displayed to be darkened, and first to third display items 421, 423, 425 are displayed in the item display area 420.

Figure 4B:
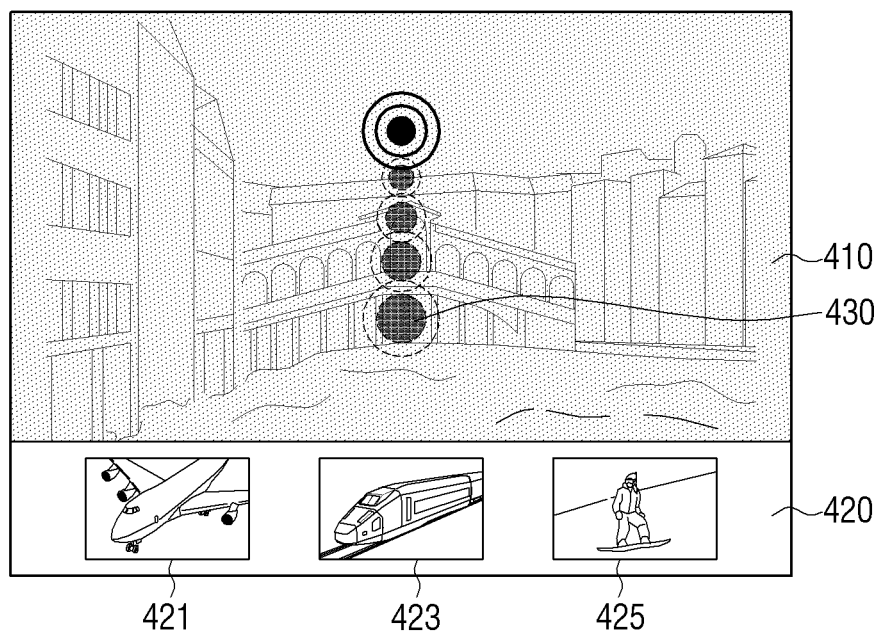
Figure 4C:
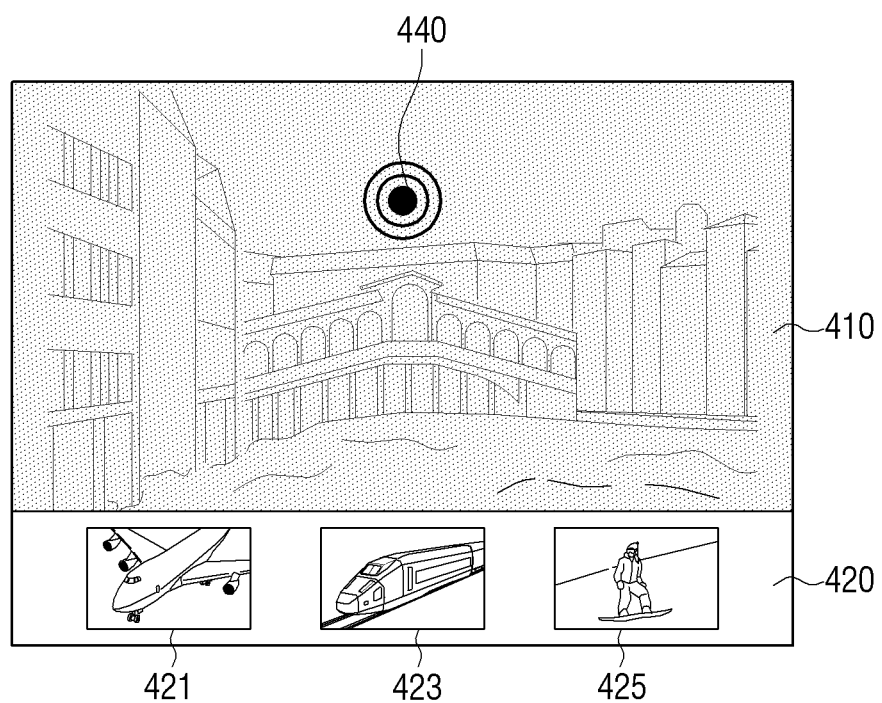

Referring to FIGS. 4B and 4C, in response to a user voice for changing the manipulation mode of the display apparatus 200 to a voice manipulation mode (for example, "Hi TV") being received through the input interface 260 while the display apparatus 200 maintains the cursor manipulation mode, the controller 270 changes the manipulation mode of the display apparatus 200 to the voice manipulation mode. In response to the manipulation mode of the display apparatus 200 being changed to the voice manipulation mode, the controller 270 controls the display 220 to change the cursor 430 to, and display, a mode guide icon 440 that represents the voice manipulation mode, as illustrated in FIG. 4C. In this case, as illustrated in FIG. 4B, the controller 270 provides a morphing animation effect of gradually changing the cursor 430 to the mode guide icon 440. In addition, the mode guide icon 440 is located in a predetermined area on the display screen (for example, an upper central area). That is, the controller 270 controls the display 220 to move the cursor 430 to a predetermined location on the display screen, and change the cursor 430 to the mode guide icon 440.

Figure 5A:
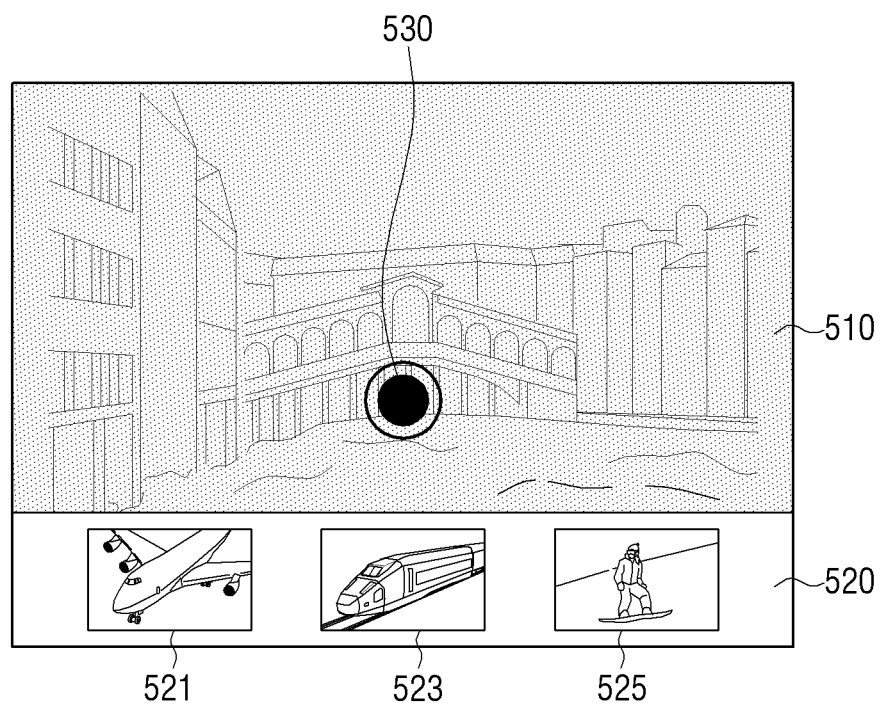

Referring to FIG. 5A, in response to a user manipulation of touching the touch panel in an area of the input interface 260 being received while a plurality of display items are displayed, the controller 270 changes the manipulation mode of the display apparatus 200 to the cursor manipulation mode. When the manipulation mode of the display apparatus 200 is the cursor manipulation mode, the controller 270 controls the display 220 to divide the display screen into a deactivated area 510 and an item display area 520, and display a cursor 530 in an area of the display area, as illustrated in FIG. 5A. In this case, an image content in the deactivated area 510 is processed and displayed to be darkened, and first to third display items 521, 523, 525 are displayed in the item display area 520.

Figure 5B:
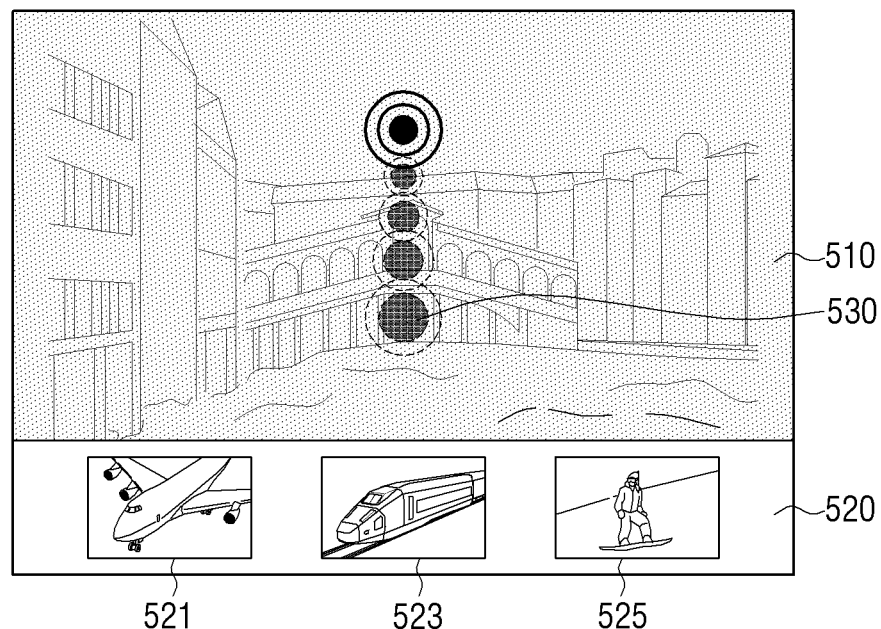
Figure 5C:
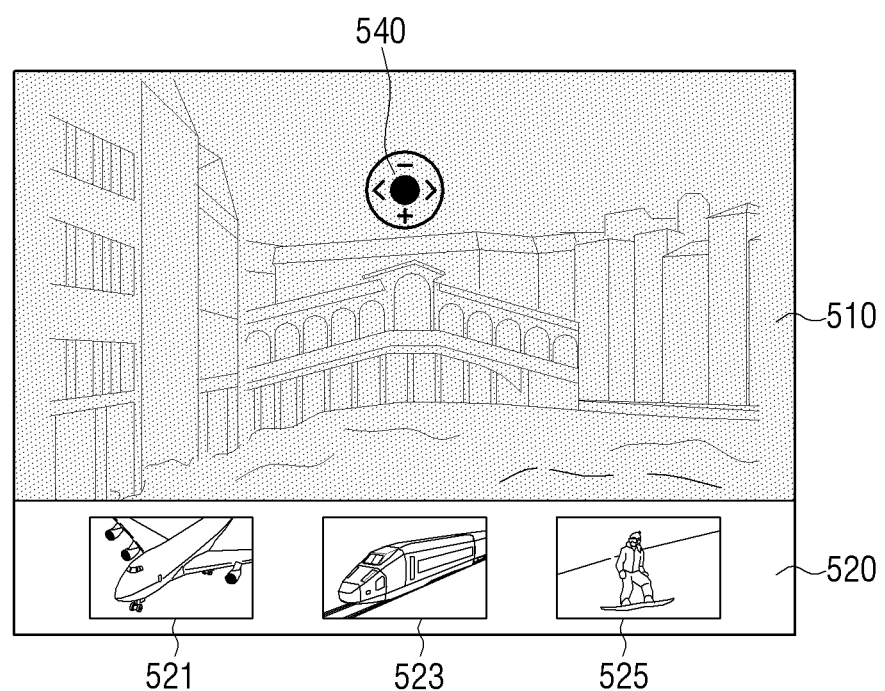

Referring to FIGS. 5B and 5C, in response to a user motion for changing the manipulation mode of the display apparatus 200 to the motion manipulation mode (for example, a user motion of waving a hand several times) being received through the input interface 260 while the display apparatus 200 maintains the cursor manipulation mode, the controller 270 changes the manipulation mode of the display apparatus 200 to the motion manipulation mode. In response to the manipulation mode of the display apparatus 200 being changed to the motion manipulation mode, the controller 270 controls the display 220 to change the cursor 530 to, and display, a mode guide icon 540 that represents the motion manipulation mode, as illustrated in FIG. 5C. In this case, as illustrated in FIG. 5B, the controller 270 provides a morphing animation effect of gradually changing the cursor 530 to the mode guide icon 540. In addition, the mode guide icon 540 is located in a predetermined area on the display screen (for example, an upper central area). That is, the controller 270 controls the display 220 to move the cursor 530 to a predetermined location on the display screen, and change the cursor 530 to the mode guide icon 540.

In the above described exemplary embodiments, the cursor is changed to one among the highlight and the mode guide icon, but this is only an example. That is, the highlight and the mode guide icon may be changed to the cursor. For example, as illustrated in FIG. 3C, when the manipulation mode of the display apparatus 200 is the highlight manipulation mode, the controller 270 may control the display 220 to display a highlight of one of a plurality of display items. In this case, in response to a user manipulation of changing the manipulation mode of the display apparatus 200 to the cursor manipulation mode being received, the controller 270 may control the display 220 to change the highlight to the cursor, and display the cursor 330, as illustrated in FIG. 3A.

In addition, in response to the manipulation mode of the display apparatus 200 being changed to the motion manipulation mode or the voice manipulation mode while the display apparatus 200 operates in the highlight manipulation mode, the controller 270 may control the display 220 to change the highlight to, and display, the mode guide icon.

Figure 6A:
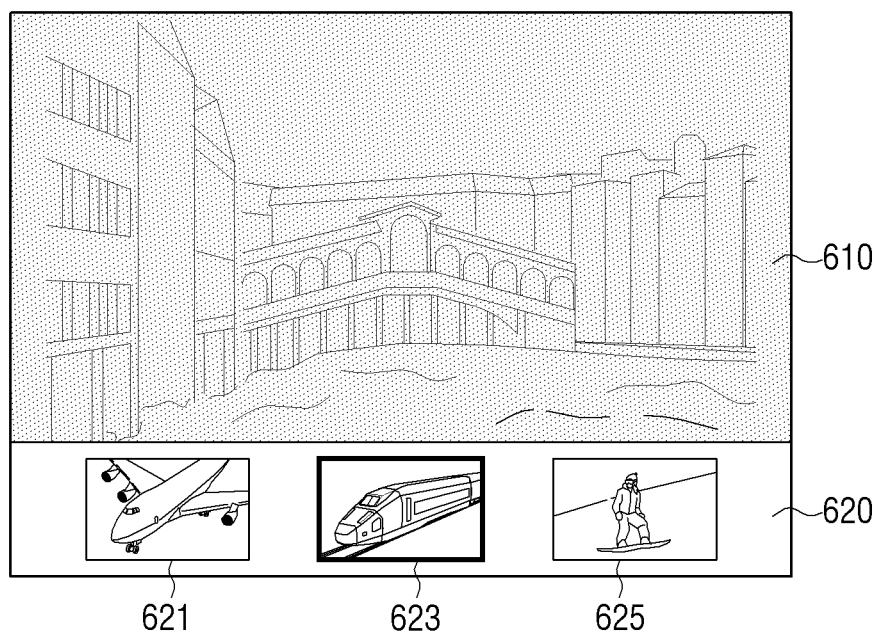

In detail, referring to FIG. 6A, in response to a user manipulation of releasing a user touch to the touch panel in an area of the input interface 260 being received while a plurality of display items are displayed, the controller 270 maintains the manipulation mode of the display apparatus 200 to be the highlight manipulation mode. When the manipulation mode of the display apparatus 200 is the highlight manipulation mode, the controller 270 controls the display 220 to divide the display screen into a deactivated area 610 and an item display area 620, and display a highlight of a second display item 623 among first to third display items 621, 623, and 625 on the display screen, as illustrated in FIG. 6A. In this case, an image content in the deactivated area 610 is processed and displayed to be darkened, and the first to third display items 621, 623, 625 are displayed in the item display area 620.

Figure 6B:
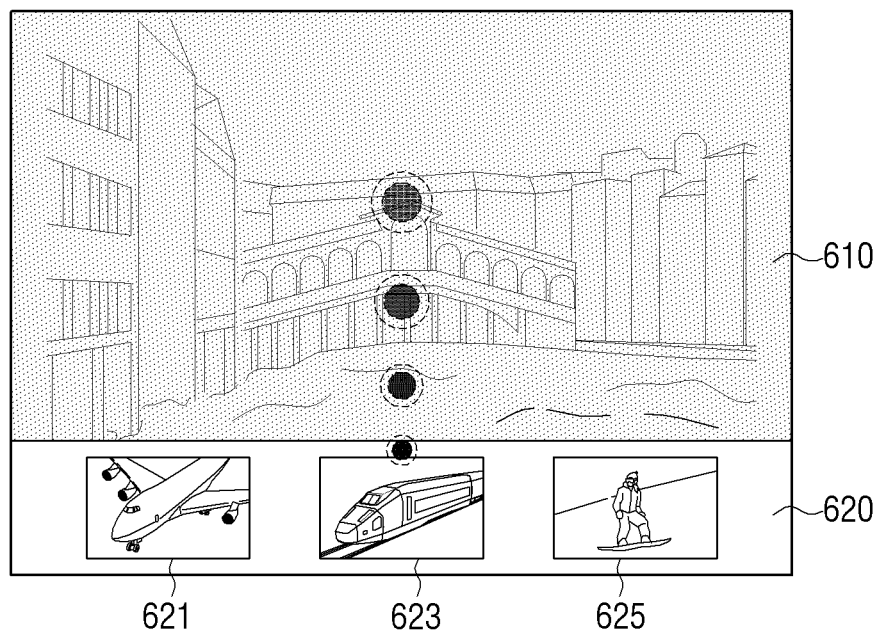
Figure 6C:
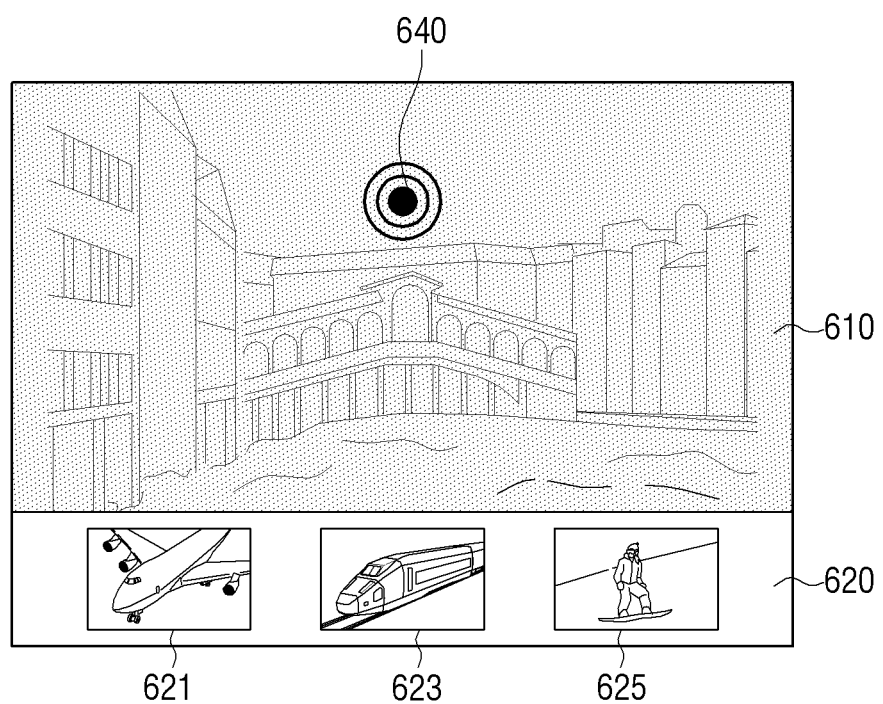

Referring to FIGS. 6B and 6C, in response to a user voice for changing the manipulation mode of the display apparatus 200 to the voice manipulation mode (for example, "Hi TV") being received through the input interface 260 while the display apparatus 200 maintains the highlight manipulation mode, the controller 270 changes the manipulation mode of the display apparatus 200 to the voice manipulation mode. In response to the manipulation mode of the display apparatus 200 being changed to the voice manipulation mode, the controller 270 controls the display 220 to change the highlight to, and display, a mode guide icon 640 that represents the voice manipulation mode, as illustrated in FIG. 6C. In this case, as illustrated in FIG. 6B, the controller 270 provides a morphing animation effect of gradually changing the highlight to the mode guide icon 640. In addition, the controller 270 controls the display 220 to move the highlight of the second display item 623 to a predetermined location on the display screen, and changes the highlight to the mode guide icon 640.

Referring to FIG. 7, in response to one among a cursor 710, a highlight, a mode guide icon 720, and a mode guide icon 730 being changed to another one among the cursor 710, the highlight, the mode guide icon 720, and the mode guide icon 730 according to the manipulation mode of the display apparatus 200, the controller 270 provides a morphing animation effect of gradually changing a shape and size of an object to be changed.

Figure 8:
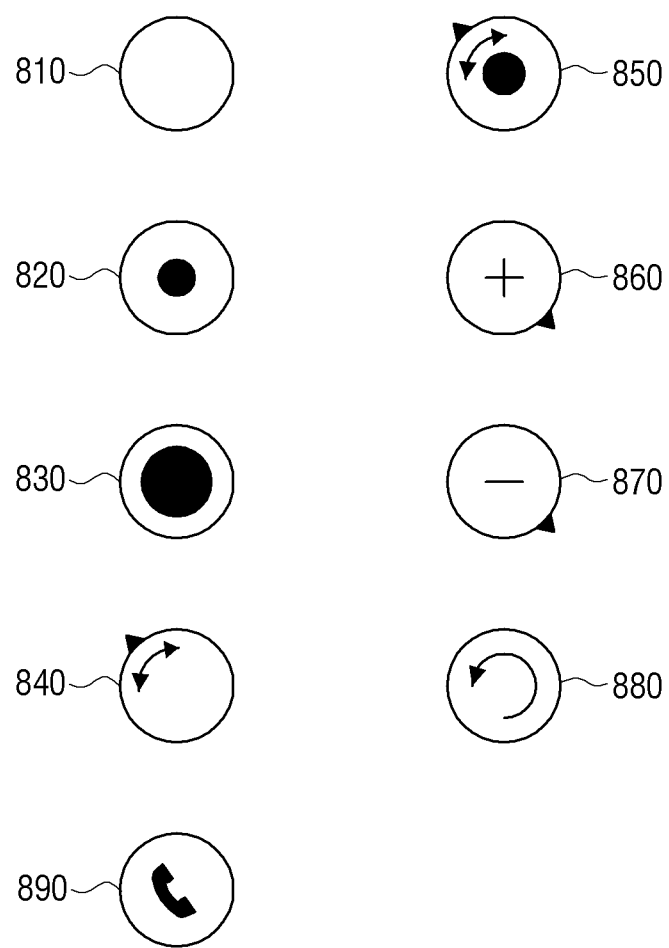

Referring to FIG. 8, when the manipulation mode of the display apparatus 200 is the cursor manipulation mode, the controller 270 may control the display 220 to display an icon corresponding to at least one among status information on a cursor and status information on the display apparatus 200, in the cursor. For example, when the cursor is not located on a selectable item, the controller 270 may control the display 220 to display a first form 810 of the cursor. In addition, when the cursor is located on a selectable item (for example, a thumbnail, button, etc.), the controller 270 may control the display 220 to display a second form 820 of the cursor including a circle inside the cursor. When a user selects an item by using the cursor, the controller 270 may control the display 220 to display a third form 830 of the cursor by enlarging a circle in the cursor. When a zooming operation is possible in an area where the cursor is located, the controller 270 may control the display 220 to display a fourth form 840 of the cursor including an arrow mark inside the cursor.

In addition, when the cursor is selectable and the zooming operation is possible, the controller 270 may control the display 220 to display a fifth form 850 of the cursor including a circle and an arrow mark inside the cursor. When a zoom-in operation is performed with respect to the area where the cursor is located, the controller 270 may control the display 220 to display a sixth form 860 of the cursor where '(+)' mark is displayed inside the cursor as a knob outside the cursor turns. When a zoom-out operation is performed with respect to the area where the cursor is located, the controller 270 may control the display 220 to display a seventh form 870 of the cursor where '(−)' mark is displayed inside the cursor as the knob outside the cursor turns. When the cursor is located in a deactivated area, the controller 270 may control the display 220 to display an eighth form 880 of the cursor including a 'BACK' icon for returning to a previous state, inside the cursor. When a call request is received from outside, the controller 270 may control the display 220 to display a ninth form 890 of the cursor including a call icon that represents the call request, inside the cursor.

Figure 9A:
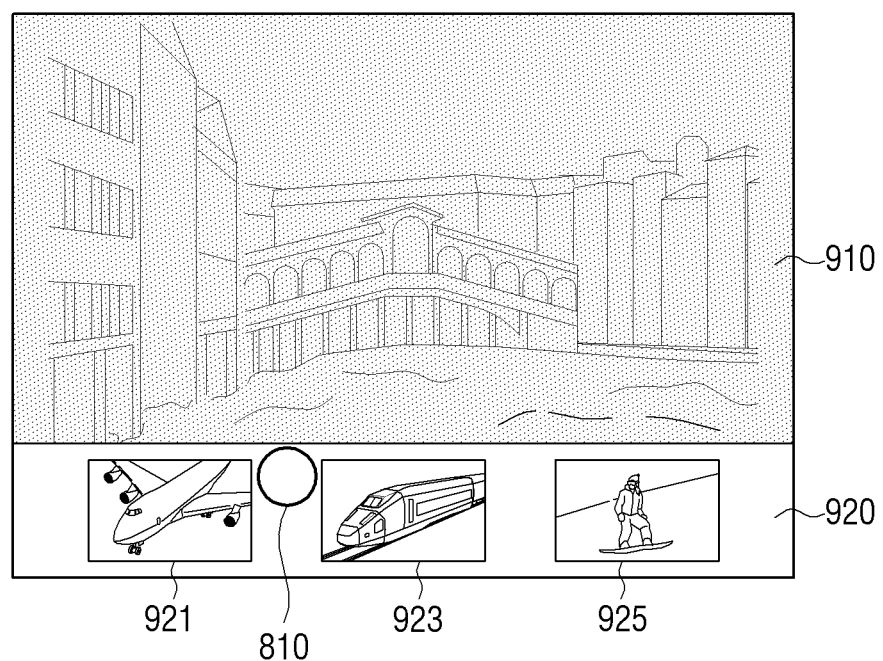

Referring to FIG. 9A, in response to a user manipulation of touching the touch panel in an area of the input interface 260 being received while at least one display item is displayed, the controller 270 maintains the manipulation mode of the display apparatus 200 to the cursor manipulation mode. When the manipulation mode of the display apparatus 200 is the cursor manipulation mode, the controller 270 controls the display 220 to divide a display screen into a deactivated area 910 and an item display area 920, and display a cursor in an area of the display screen. In this case, an image content in the deactivated area 910 is processed and displayed to be darkened, and first to third display items 921, 923, 925 are displayed in the item display area 920. When the cursor is not located in a selectable display item while the display apparatus 200 operates in the cursor manipulation mode, the controller 270 controls the display 220 to display the first form 810 of the cursor.

Figure 9B:
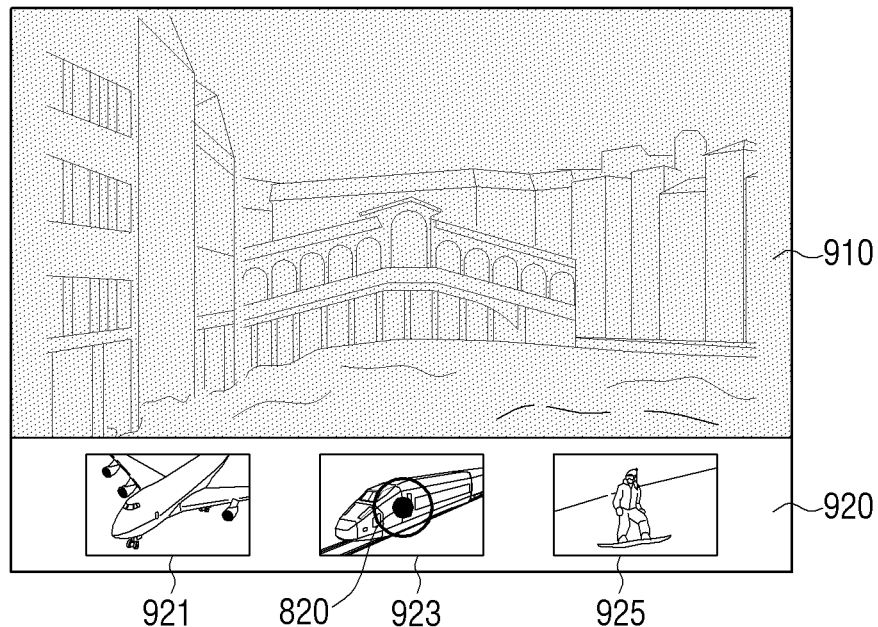
Figure 9C:
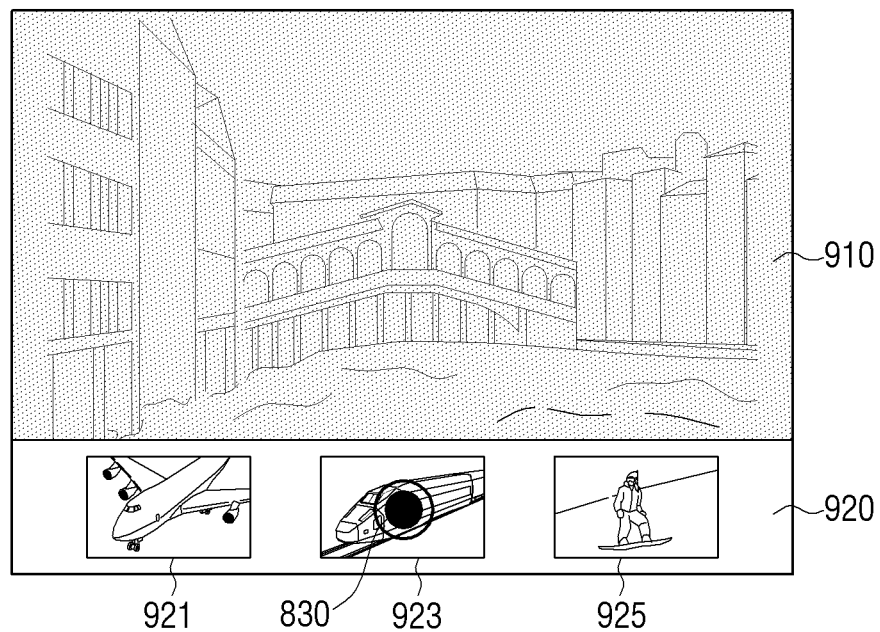

Referring to FIG. 9B, when the cursor is located on the selectable second display item 923 according to a user manipulation of moving the cursor, the controller 270 controls the display 220 to display the second form 820 of the cursor. Referring to FIG. 9C, when a user manipulation of selecting the second item 923 is received while the cursor is located on the second display item 923, the controller 270 controls the display 220 to display the third form 830 of the cursor.

Figure 9D:
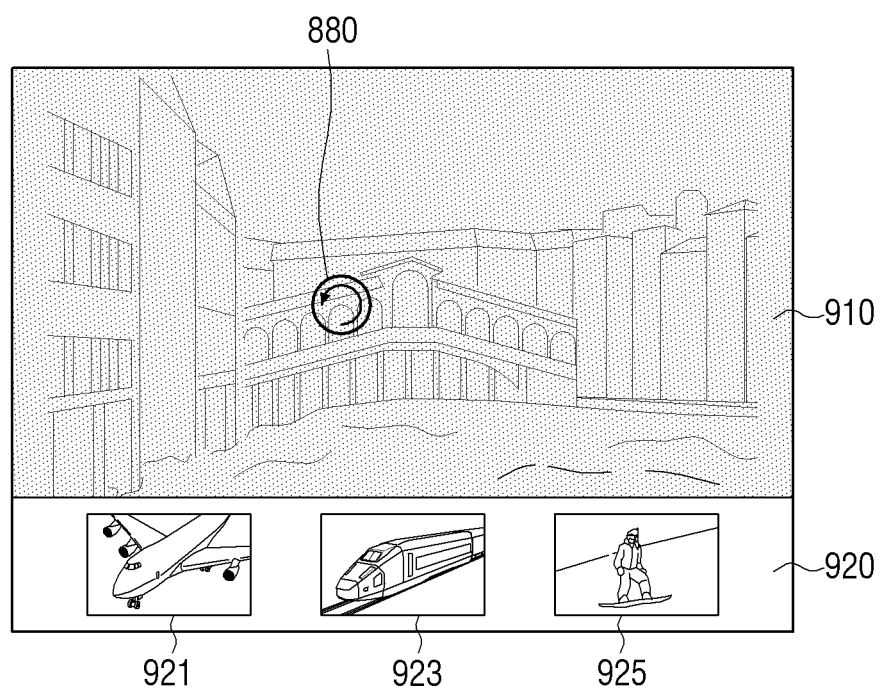
Figure 9E:
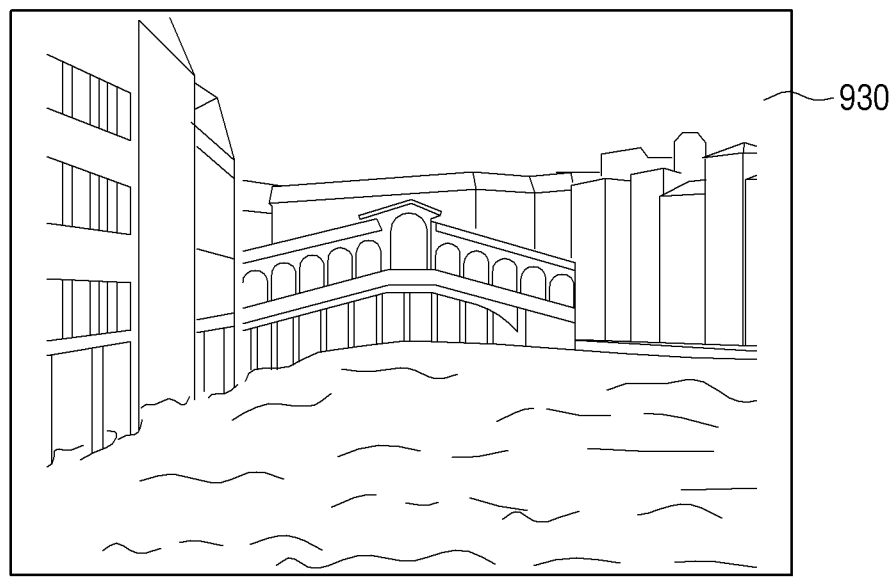

Referring to FIG. 9D, in response to a user manipulation of moving the cursor to the deactivated area 910 being received, the controller 270 controls the display 220 to display the eighth form 880 of the cursor including the 'BACK' icon for returning to a previous state (that is, a state where a menu is removed and an image content is displayed). Referring to FIG. 9E, in response to a user select command being received while the eighth form 880 of the cursor including the 'BACK' icon is displayed (i.e., a selecting input of the eighth form 880 of the cursor), the controller 270 controls the display 220 to remove the menu (i.e., the first to third display items 921, 923, 925 displayed in the item display area 920) and display an image content 930 (i.e., reactivate the deactivated area 910). That is, when only the image content 930 is displayed, the controller 270 does not display a cursor, a highlight, and a mode guide icon in a remote controller manipulation mode.

Figure 10:
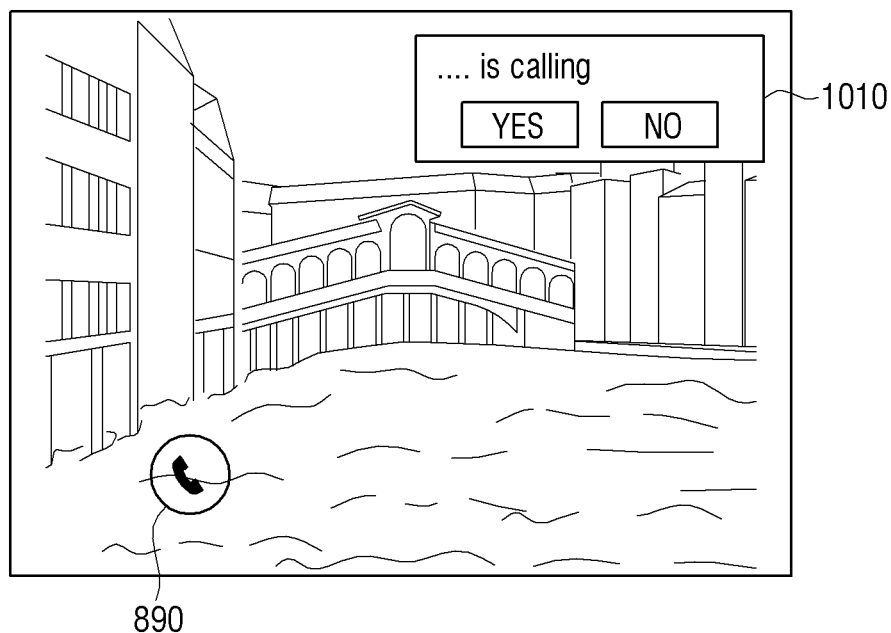

Referring to FIG. 10, in response to a call answering request being received from outside, the controller 270 controls the display 220 to display a UI 1010 that shows the call answering request in an area of the display screen, and display the ninth form 890 of a cursor including an icon that represents the call answering request inside the cursor. In addition, in response to a predetermined user manipulation (for example, a user command to select an 'OK' button) being received while the ninth form 890 of the cursor including the icon that represents the call answering request is displayed, the controller 270 may perform a telephone conversation by accepting the call answering request. As above, a user workload may be minimized by including an icon that represents the status information on the display apparatus 200 in the cursor, and immediately executing functions of the display apparatus 200 using a predetermined user command.

Figure 11:
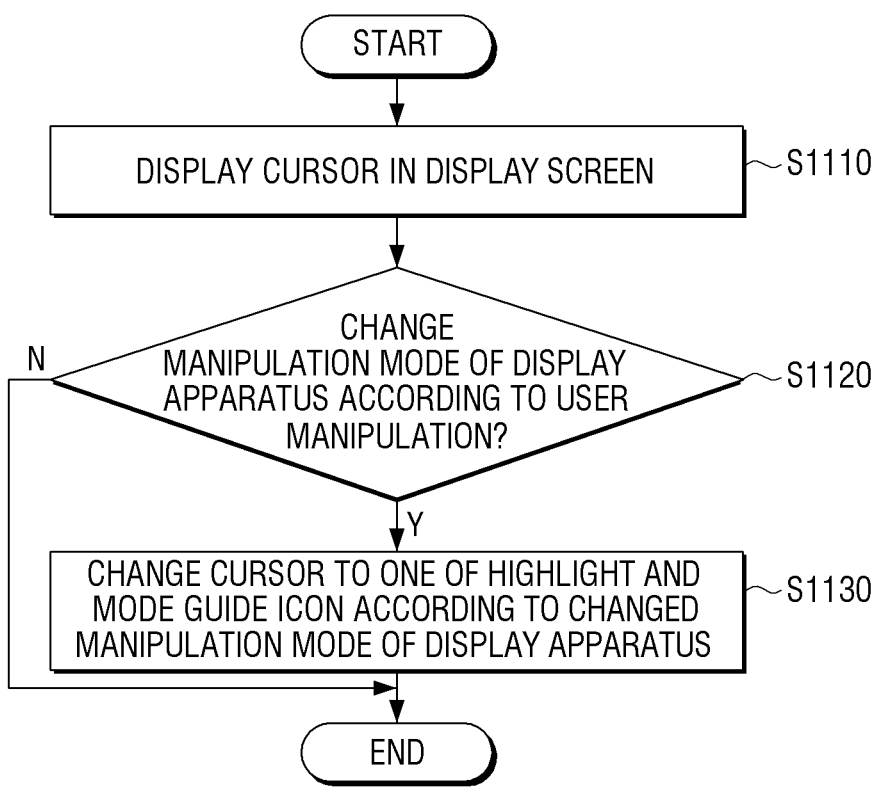
FIG. 11 is a flowchart illustrating a displaying method of a display apparatus according to an exemplary embodiment.

FIG. 11 is a flowchart illustrating a displaying method of a display apparatus according to an exemplary embodiment.

In operation S1110, the display apparatus 100 displays a cursor in a display screen. In this case, the display apparatus 100 may operate in a cursor manipulation mode.

In operation S1120, the display apparatus 100 determines whether the manipulation mode of the display apparatus 100 is changed according to a user manipulation. In response to the display apparatus 100 determining that the manipulation mode of the display apparatus 100 is changed according to the user manipulation, the display apparatus 100 proceeds to operation S1130. Otherwise, the method ends.

In operation S1130, the display apparatus 100 changes the cursor to one of a highlight and a mode guide icon according to the changed manipulation mode of the display apparatus 100. For example, in response to the manipulation mode of the display apparatus 100 being changed to the highlight manipulation mode, the display apparatus 100 may change the cursor to, and display, the highlight. In response to the manipulation mode of the display apparatus 100 being changed to the motion manipulation mode or the voice manipulation mode, the display apparatus 100 may change the cursor to, and display, the mode guide icon. In addition, when the cursor is changed to the highlight or the mode guide icon, the display apparatus 100 may provide a morphing animation effect of gradually changing a location, size, and a shape of the cursor.

According to the above described displaying method, the method enables a user to check the manipulation mode of the display apparatus any time and enjoy entertainment elements.

In addition, the exemplary embodiments may also be implemented through computer-readable code and/or instructions on a medium, e.g., a non-transitory computer-readable medium, to control at least one processing element to implement any of the above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) and digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A displaying method of a display apparatus, the method comprising:
   displaying a cursor and display items;
   changing a manipulation mode of the display apparatus based on an input; and
   changing the cursor to a highlight or a mode guide icon corresponding to the changed manipulation mode,
   wherein the changing the cursor further comprises:
      moving the cursor to a display item closest to the cursor among the display items, and changing the cursor to the highlight of the display item, in response to the changed manipulation mode corresponding to a highlight manipulation mode, and
      moving the cursor to a location on a display, and changing the cursor to the mode guide icon corresponding to the changed manipulation mode in response to the changed manipulation mode corresponding to a motion manipulation mode or a voice manipulation mode.

2. The method as claimed in claim 1, wherein the changing the manipulation mode comprises changing the manipulation mode to the highlight manipulation mode in response to the input being a release of a touch input to a touch area of an input interface.

3. The method as claimed in claim 1, wherein the changing the cursor comprises morphing the cursor to gradually change the cursor to the highlight or the mode guide icon.

4. The method as claimed in claim 1, further comprising displaying, in the cursor, an icon corresponding to a status of the cursor and/or a status of the display apparatus.

5. The method as claimed in claim 1, further comprising:
   displaying an interface that shows a call answering request in an area of the display, and displaying, in the cursor, an icon corresponding to the call answering request, in response to the call answering request; and
   accepting the call answering request in response to a selecting input of the icon.

6. A display apparatus comprising:
   a display configured to display a cursor and display items; and
   a controller configured to:
      change a manipulation mode of the display apparatus based on an input; and
      control the display to change the cursor to a highlight or a mode guide icon corresponding to the changed manipulation mode,
   wherein the controller is further configured to:
      control the display to move the cursor to a display item closest to the cursor among the display items, and change the cursor to the highlight of the display item, in response to the changed manipulation mode corresponding to a highlight manipulation mode, and
      control the display to move the cursor to a location on the display, and to change the cursor to the mode guide icon corresponding to the changed manipulation mode in response to the changed manipulation mode corresponding to a motion manipulation mode or a voice manipulation mode.

7. The display apparatus as claimed in claim 6, wherein the controller is further configured to change the manipulation mode to the highlight manipulation mode in response to the input being a release of a touch input to a touch area of an input interface.

8. The display apparatus as claimed in claim 6, wherein the controller is further configured to control the display to morph the cursor to gradually change the cursor to the highlight or the mode guide icon.

9. The display apparatus as claimed in claim 6, wherein the controller is further configured to control the display to display, in the cursor, an icon corresponding to a status of the cursor and/or a status of the display apparatus.

10. The display apparatus as claimed in claim 6, wherein the controller is further configured to control the display to:
    display an interface that shows a call answering request in an area of the display, and display, in the cursor, an icon corresponding to the call answering request, in response to the call answering request; and
    accept the call answering request in response to a selecting input of the icon.

11. A displaying method of a display apparatus, the method comprising:
    displaying a cursor;
    displaying image content;
    displaying a menu in an area of the display on which the image content is displayed, and deactivating a remaining area of the display, in response to a menu generating input;
    displaying, in the cursor, an icon corresponding to a previous command, in response to an input moving the cursor to the deactivated remaining area; and
    removing the menu, and activating the remaining area, in response to a selecting input of the icon.

12. A display apparatus comprising:
    a display configured to display a cursor; and
    a controller configured to:
       display image content;
       display a menu in an area of the display on which the image content is displayed, and deactivate a remaining area of the display, in response to a menu generating input;
       display, in the cursor, an icon corresponding to a previous command, in response to an input moving the cursor to the deactivated remaining area; and
       remove the menu, and activate the remaining area, in response to a selecting input of the icon.

13. A display apparatus comprising:
    a display configured to display an interface element and display items, and to highlight the interface element; and
    a controller configured to:
       change an interface mode of the display apparatus based on an input; and
       control the display to change the highlight to a cursor or a mode guide icon corresponding to the changed interface mode,
    wherein the controller is further configured to:
       control the display to move the cursor to a display item closest to the cursor among the display items, and change the cursor to the highlight of the interface element, in response to the changed interface mode corresponding to a highlight interface mode, and control the display to move the cursor to a location on the display, and to change the cursor to the mode guide icon corresponding to the changed interface mode in response to the changed interface mode corresponding to a motion interface mode or a voice manipulation mode.

14. The display apparatus of claim 13, wherein the display is further configured to display interface elements, and the highlight is of the interface element among the interface elements.

* * * * *